United States Patent
Mangnus et al.

(10) Patent No.: US 6,194,345 B1
(45) Date of Patent: Feb. 27, 2001

(54) PROCESS FOR ACTIVATING HALOGENATED CATALYSTS, CATALYSTS OBTAINED BY THIS PROCESS, AND USE OF THESE CATALYSTS IN ACID CATALYST PROCESSES

(75) Inventors: Peter Mangnus, Pays-Bas (NL); Alain Milan; Georges Szabo, both of Montivilliers (FR)

(73) Assignees: Total Raffinage Distribution S.A., Puteaux (FR); Akzo Nobel N.V., Paysbas (NL)

( * ) Notice: Subject to any disclaimer, the term of this patent is extended or adjusted under 35 U.S.C. 154(b) by 0 days.

(21) Appl. No.: 09/319,595

(22) PCT Filed: Dec. 9, 1996

(86) PCT No.: PCT/FR96/01961

§ 371 Date: Sep. 10, 1999

§ 102(e) Date: Sep. 10, 1999

(87) PCT Pub. No.: WO98/25699

PCT Pub. Date: Jun. 18, 1998

(51) Int. Cl.[7] .......... B01J 27/06; B01J 27/125; B01J 27/128; B01J 27/13
(52) U.S. Cl. .......... 502/224; 502/203; 502/207; 502/227; 502/228; 502/229; 502/230; 502/231
(58) Field of Search .......... 502/203, 207, 502/224, 227, 228, 229, 230, 231

(56) References Cited

U.S. PATENT DOCUMENTS

| | | |
|---|---|---|
| 3,979,333 | 9/1976 | Myers . |
| 4,201,696 * | 5/1980 | Legendre et al. .......... 585/744 |
| 4,283,585 * | 8/1981 | Legendre et al. .......... 585/482 |
| 4,465,786 | 8/1984 | Zimmer et al. . |
| 4,654,463 | 3/1987 | Sun et al. . |
| 5,151,400 * | 9/1992 | Szabo et al. .......... 502/203 |
| 5,292,988 | 3/1994 | Wu . |
| 5,561,095 * | 10/1996 | Chen et al. .......... 502/169 |
| 5,789,335 * | 8/1998 | Chen et al. .......... 502/169 |

FOREIGN PATENT DOCUMENTS 439 338   7/1991   (EP) .

* cited by examiner

Primary Examiner—Elizabeth D. Wood
(74) Attorney, Agent, or Firm—Sughrue, Mion, Zinn, Macpeak & Seas, PLLC

(57) ABSTRACT

The invention relates to a process of activating a supported acid catalyst, and consists in the conversion of Lewis acid-type acid sites which are deposited on a solid substrate into activated acid sites in a non-oxydizing acid medium. The catalyst is exposed to a phase of activation in a medium containing a holohydric acid or a halohydric acid precursor, in the presence of at least one preferably parafinic hydrocarbon or hydrocarbon derivative, at a temperature greater than 20° and preferably between 100° C. and 250° C., and at a pressure of between $10^5$ and $50,10^6$ Pa, for a length of time sufficient to ensure conversion into activated acid sites.

29 Claims, No Drawings

PROCESS FOR ACTIVATING HALOGENATED CATALYSTS, CATALYSTS OBTAINED BY THIS PROCESS, AND USE OF THESE CATALYSTS IN ACID CATALYST PROCESSES

This invention relates to a new process for activating solid halogenated catalysts, and more particularly, supported catalysts with Lewis type sites.

We know that catalysts with an aluminum halide can be used in many processes of hydrocarbon treatment such as processes for the isomerization of paraffins, or processes for the alkylation of aromatic hydrocarbons or isobutane.

Such catalysts have been described in literature, for example in the French patents 2 320 775, 2 206 124, 2 201 128, 1 546 658 or the English patent 952 348.

In general, these catalysts contain a support, which can be an alumina, a silica, an alumina silica, an aluminosilicate or a mixture of these compounds. From among these catalysts, we can name those that contain acid sites of the Lewis acid type, obtained by a deposit of a metallic halide such as an aluminum, boron, gallium, zirconium, molybdenum, tungsten or titanium halide, and, more particularly, an aluminum chloride on the surface of the support, where these acid sites are susceptible of being transformed into activated acid sites, most likely of the Brönstedt type (because they are similar to those that result from the $AlCl_3$/HCl association of catalysts of the Friedel and Crafts type), by action of a strong acid such as a halohydrous acid.

Among these catalysts, it has already been established (see French patent 2 649 989, of which the applicants are a joint holders) that the so-called "bimetallic" catalysts, in other words which contain a metal belonging to the platinum group metals associated with Lewis type sites, consisting in particular, in addition to the aluminum halides, of the halides of a metal called "promoter", such as zirconium, molybdenum, tungsten or titanium, show an improved catalytic activity when subjected to an activation phase under specific conditions, between the actual preparation phase of these catalysts and the utilization phase of the latter in reactors where the reaction to be catalyzed is carried out.

Still according to the prior technique, we know that the activity of these catalysts increases considerably when the Lewis type acid sites are transformed into activated acid sites of the Brönstedt type by reaction with a halohydrous acid, usually hydrochloric acid, at a high temperature, meaning above a temperature of approximately 200° C. and preferably above 350° C., provided one proceeds in a non-oxidizing or reducing environment, meaning in the presence of a gas that can, at least partially, contain hydrogen. In this case, we have a direct reaction of the Lewis type sites with the hydrochloric acid, so as to create activated acid sites. However, in order to correctly promote these activated sites and ensure a good activity of the catalyst, the reaction must be carried out at high temperatures, at least equal to 400° C., and increasingly higher as the final desired activity is stronger.

Of course, such a temperature, along with the acidity of the environment, causes unavoidable corrosion problems of the material being used, and possibly contributes to a pollution of the catalyst, which is translated by significant investment costs.

In continuing her work in this field, the applicant has highlighted the fact that it is possible to obtain a considerable improvement of the activity by using a path of activation that is different from those of the prior art, meaning less costly and less polluting.

The applicant has indeed noticed, surprisingly so, that by incorporating a substantial quantity of a paraffin-base hydrocarbon to the acid environment of the reaction, one can activate the catalyst under milder conditions, at much more moderate temperatures, in the 150° C. range, and that this in consequence results in manufacturing costs that are much lower.

Therefore, the object of this invention is a process for activating a supported acid catalyst that contains Lewis acid type acid sites deposited on a solid support, by transforming, in an acid and non-oxidizing environment, said sites into activated acid sites, this process has an activation phase in an environment that contains a halohydrous acid or a halohydrous acid precursor, and is characterized by the fact that said activation phase is carried out in the presence of at least one hydrocarbon or one hydrocarbon derivative, preferably paraffin-based, with a halogen to hydrocarbon ratio that is greater than 0.001, at a temperature that is greater than 20° C. and, preferably, ranging between 100° C. and 250° C., at a pressure ranging between $10^5$ and $5.10^6$ Pa, for a period of time that is sufficient to obtain the transformation into activated acid sites.

In the rest of this description, we will refer in particular to the hydrochloric acid and its precursors, such as halohydrous acid, but the invention is of course, not limited to this acid.

The activation method as set forth in the invention is therefore very different from the methods described in the prior art. Indeed, according to the invention, the hydrocarbon that is introduced in the reaction environment seems to react with the Lewis type acid sites in order to create a complex on which will later react the halohydrous acid, in particular the hydrochloric acid. Contrary to the usual methods of activation, there does not seem to be, in this case, a direct chemical reaction between the Lewis type sites and the hydrochloric acid. This has the advantage of avoiding problems related to corrosion and resistance to materials encountered previously when the activation temperature was higher, along with well known problems tied to the use of hydrochloric acid at a high temperature.

The hydrocarbon contained in the environment in which said activation phase in carried out belongs to the C4 and C8 hydrocarbon family, preferably C5 and C6 hydrocarbons, and that of their halogenated derivatives.

Advantageously, the non oxidizing or reducing acid environment used in the activation phase of the process as set forth in the invention will contain a halohydrous acid or a halohydrous acid precursor.

Preferably, the halohydrous acid is hydrochloric acid and the halohydrous acid precursor is preferably carbon tetrachloride.

The Lewis site type acid sites of the activated catalyst as set forth in the invention are metallic halides of the type obtained by deposit of a metallic halide (preferably chlorine or bromine) such as an aluminum, boron, gallium or zirconium halide, or more particularly an aluminum halide or mixtures thereof on the support surface.

The catalyst supports as set forth in the invention contain heat-resistant substances have a sufficient specific surface and pore volume, and in addition have superficial chemical functions. These supports can be an alumina, a silica, an alumina silica, an aluminosilicate or a mixture of the latter, magnesia, zirconia, or gallium, titanium, thorium, boron oxides or a mixture of these oxides. Aluminas that are particularly suitable are the gamma-alumina and the eta-alumina. These aluminas serve as support for the other components of the catalyst and must therefore preferably be, for the most part, sodium free.

The most advantageous catalysts are those whose content in platinum group metals (that is to say metals chosen from among platinum, ruthenium, rhodium, palladium and iridium), in relation to the weight of the support, ranges between 0.02% and 2% by weight, preferably between 0.05% and 0.8% by weight. These catalysts can be bimetallic or trimetallic. This then makes it possible to profit from the advantages obtained by a catalyst that contains platinum and zirconium, which was not possible in the prior technique, because of the high temperature that was required.

In order to obtain satisfactory catalytic properties, the content in platinum group metals is preferably greater than 0.10%, but, because of the cost of metal, it is preferably limited to 0.80%. The deposit on the support takes place through means known in themselves, for example through impregnation using solutions that contain the metals being used, either in anionic form, or in cationic form. The support can then, also in a manner known in itself, be dried, then possibly calcined in a reducing environment at a temperature that usually ranges between 400 and 600° C.

The step used for the formation on the support of one or several Lewis type acid type metallic halides can take place in several ways, also all known in themselves, whose characteristics will be briefly explained.

The first method was described through an example in the English patent No 952 348, in the case of the deposit of an aluminum halide. According to this method, the deposit of a Lewis site precursor is carried out by action in a trialkylaluminum, and in particular a triisobutylaluminum, anhydrous environment, that attaches the Lewis site precursor by eliminating an isobutane molecule. The product obtained in this manner is then transformed into aluminum dihalogenide by reaction with the anhydrous hydrochloric acid.

A variant of the previous method has been described through an example in the French patent No 2 206 124, according to which this time the dichloroaluminate precursor is prepared by reaction of the support with a hydrocarbylaluminum halide, still in an anhydrous environment, before the transformation into dichloride, also by hydrochloric acid.

A third method, more direct, as described in the French patents No 2 202 128 and No 2 320 775, consists in directly using the reaction of the support with the metallic halide. The latter being a solid, it is sublimate at a high temperature, preferably greater than 200° C., in the presence of a diluting gas.

The non oxidizing and acid environment used in the activation phase of the process as set forth in the invention will contain hydrogen and/or an inert gas among the catalyst constituents, or a hydrogen or inert gas precursor, in the case where the catalyst contains at least one platinum group metal. The presence of hydrogen in the reaction environment is necessary when the catalyst to be activated is composed of at least one platinum group metal such as platinum, ruthenium, rhodium, palladium or iridium. Indeed, the role of the hydrogen is to stop the platinum from irreversibly dehydrogenating the hydrocarbons that are present in the environment, which would result in poisoning the metallic sites and thus in harming the stability of the catalyst.

The activation process of the catalyst as set forth in the invention has the advantage of being attainable both during the preparation of the catalyst at the manufacturer's and directly in situ in the reactor where the reaction requiring such a catalyst takes place.

When the catalyst with Lewis type acid sites is activated at the manufacturer's, in accordance with this invention, the activated catalyst must be isolated, then placed in an area where there is no humidity.

When the activation phase is carried out in situ, the catalyst still containing Lewis type sites, is placed under the operational conditions of the desired reaction. In particular, for a paraffin isomerization reaction, the operational conditions are a temperature ranging between 50° C. and 250° C., a pressure ranging between $10^5$ and $5.10^6$ Pa, a hydrogen to hydrocarbon molar ratio that ranges between 0.001 and 10 and an hourly space velocity ranging between 0.1 and 10 $h^{-1}$.

The hourly space velocity represents the quantity of hydrocarbon that passes over a unit quantity of catalyst in one hour.

Whatever the operation being carried out, the activation of the catalyst is complete when the final halogen content, in particular chlorine, of the catalyst ranges between 2% and 10% by weight, preferably between 3% and 8% by weight. The duration of the passage of the hydrocarbonic charge over the catalyst must be sufficient for at least 0.5% by weight of chlorine, in relation to the weight of the catalyst, to pass through the catalytic bed.

A preferred source of chlorine could be a chlorinated hydrocarbon of the charge itself This source of chlorine has the advantage of avoiding an external input of chlorine, which would inevitably contribute to an increase of the costs of the process.

This chlorinated hydrocarbon may be chosen from among the following compounds: carbon tetrachloride, ethane chloride, propane chloride, butane chloride, isobutane chloride.

The ratio of chlorine to hydrocarbon that is needed for the activation process as set forth in the invention, must be greater than 0.001, and preferably greater than 0.005, in order to immediately favor the formation of the hydrocarbon/Lewis type site complex through adsorption, and not through the direct attack by the hydrochloric acid on the Lewis type sites. Indeed, if the hydrochloric acid were put in contact with the catalyst first, it would react in a direct manner with the Lewis type sites, which, at the temperature of the invention, would lead to an incomplete transformation of the Lewis type sites into Brönstedt type sites.

The catalyst can be put in contact with the hydrocarbon and the hydrochloric acid in a continuous or discontinuous manner. The following combinations may be retained: hydrocarbon and acid introduced simultaneously, or hydrocarbon introduced before the acid, or yet hydrocarbon and acid introduced simultaneously followed once again by the acid.

The partial pressure in hydrocarbon is at least equal to that in hydrochloric acid which ranges between $10^2$ Pa and $10^5$ Pa.

Following the activation phase, whose duration generally ranges between 15 minutes and several hours, the catalyst will advantageously have:

a platinum content that, in relation to the weight of the support, ranges between 0.05% and 5%, a possible metal content of the zirconium, molybdenum, tungsten or titanium type that, in relation to the weight of the support, ranges between 0.05% and 10%, a content of added aluminum, boron or gallium that, in relation to the weight of the support, ranges between 1% and 15%, a total halogen content that, in relation to the weight of the support, ranges between 0.5% and 10%.

Furthermore, the ratio of the metal from the platinum group to the metal promoting the activated catalyst will advantageously range between 0.25% and 5%.

The object of the following examples is to highlight the superiority of the activated catalysts as set forth in the invention, in relation to the prior art. They are however in no way to be considered as limitative.

EXAMPLE 1

This example relates to a method of preparation of non activated catalysts. We have here an isomerization catalyst, but this catalyst could be used in any other process.

The heat-resistant support used here for all the catalysts is an alumina, whose average characteristics are as follows:

specific surface: 200 m²/g, pore volume: 0.50 cm³/g, average pore radius: $50.10^{-8}$ cm (50 Å), form: extruded of 1.5 mm average diameter After dehydration, the alumina is divided into two batches of 100 g, respectively labeled A and B. Batch B is impregnated with a zirconium salt in 250 cm³ of normal hydrochloric acid, it is then subjected to an evaporation in a rotating evaporator, dried at around 120° C., and then calcined for 2 hours at 600° C.

Each batch is then submerged in a diluted solution of hexachloroplatinic acid in circulation, whose initial platinum concentration is such that, after spinning then drying at 120° C., the catalyst prepared from batch A (catalyst A) contains approximately 0.35% by weight of platinum, and the catalyst prepared from batch B (catalyst B) contains approximately 0.35% by weight of platinum and 0.60% by weight of zirconium. The solids are then calcined at around 530° C. in a muffle oven then subjected to a reduction by hydrogen for a period of approximately 1 hour at 500° C. They contain approximately 1.4% by weight of chlorine.

Each batch of catalyst A and B is placed in a stainless steel reactor under inert gas. Then 500 cm³ of a normal solution of dichlorethylaluminum at 50° C. is introduced in normal heptane. After one hour, we eliminate the solvent and dry the solid obtained. In this manner we obtain two catalysts, catalyst A that contains platinum and Lewis type acid sites with an aluminum base and catalyst B that contains platinum, Lewis type acid sites and zirconium.

The characteristics of the non activated catalysts prepared in this way are presented in Table I hereafter, where the contents are expressed in % by weight.

TABLE I

| Starting Catalyst | Platinum Content | Second Impregnation Salt | Second Metal Content (Zr) | Chlorine Content |
|---|---|---|---|---|
| A | 0.33 | / | / | 6.0 |
| B | 0.35 | ZrO (NO₃)₂, 2 H₂O | 0.60 | 6.2 |

We then proceed with tests intended to highlight the influence of the presence of paraffin-base hydrocarbon on the activation phase, in order to transform the Lewis sites present on the catalyst in Brönstedt type activated acid sites.

With this in mind, 10 grams of each of the non activated samples A and B are placed in a reactor and swept for one half hour by hydrogen that does or does not contain anhydrous hydrochloric acid, under atmospheric pressure, at different temperatures.

In this way, be obtain two sets of activated catalysts A1 and B1 without the presence of hydrocarbons.

Their activity has been determined by an isomerization test of a paraffin-base charge.

We have a mixture composed of 45% n-pentane, 45% n-hexane and 10% cyclohexane.

The conditions of this test are:

Total pressure: $30.10^5$ Pa

Temperature: 145° C.

H²/Hydrocarbon molar ratio: 3

Hourly space velocity: 2 weights of charge for 1 weight of catalyst per hour (PPH)

The charge contains 300 ppm of chlorine in the form of carbon tetrachloride.

This test makes it possible to determine the isomerization rate (TIN) that is the sum of the percentage of iso-pentane in the pentanes and the percentage of 2,2-dimethylbutane in the hexanes.

The activation conditions and the results of these tests are presented in Table II hereafter:

TABLE II

| | Activation Conditions | | | Catalyst Activity TIN | |
|---|---|---|---|---|---|
| Temperature | Rate (l/hr/10 g of catalyst) | | Acid Content | | |
| (° C.) | HE | HCl | % HCl | Catalyst A1 | Catalyst B1 |
| 150 | 4.2 | 0 | 0 | 0 | 1 |
| 220 | 4.2 | 0.74 | 15 | 12 | 12 |
| 450 | 4.2 | 0.74 | 15 | 85 | 89 |

We notice, in this table, that the activation of catalysts A1 and B1 in the absence of hydrocarbon is only carried out correctly at high temperatures.

Furthermore, 10 grams of each of the non activated catalysts A and B are then placed in a reactor and swept at a given temperature, for a given period of time (see Table III hereafter), by hydrogen, at a rate of 5 liters/hour, and a mixture of hydrocarbons consisting of 45% n-hexane and 10% cyclohexane, containing carbon tetrachloride (any other HCl precursor chlorinated hydrocarbon can also be used) at different content levels, with a rate of 20 grams/hour, the total pressure being $30.10^5$ Pa.

After these activation experiments, we have two new sets of catalysts A2 and A2, activated in the presence of hydrocarbons.

Their activity has been determined in an isomerization test of a paraffin-base charge, as previously, using a mixture of 45% n-pentane, 45% n-hexane and 10% cyclohexane, containing 300 ppm of chlorine in the form of carbon tetrachloride as the charge and under the conditions of $30.10^5$ Pa of total pressure, at a temperature of 145° C., with a H2/hydrocarbon molar ratio of 3, an hourly space velocity of 2 weights of charge for 1 weight of catalyst per hour The activation conditions and the results of the tests are presented in Table III hereafter.

TABLE III

| Activation Conditions | | | Catalyst Activity TIN | |
|---|---|---|---|---|
| Temperature | Cl/HC | Duration | | |
| (° C.) | Ratio | (hours) | Catalyst A2 | Catalyst B2 |
| 145 | 0.00065 | 12 | 56 | 56 |
| 145 | 0.024 | 0.75 | 93 | 94 |
| 110 | 0.024 | 0.75 | 90 | 92 |

We see from this table, that the activation as set forth in the invention can take place at moderate temperatures, approximately 150° C. A particularly interesting consequence is due to the fact that the activation phase can easily be carried out on the production site in the isomerization reactor itself.

We also note that a speedy activation phase can only take place with a sufficient hydrochloric acid/hydrocarbon ratio, preferably greater than 0.007.

Furthermore, we note that several types of hydrocarbons can be used in the activation as set forth in the invention.

EXAMPLE 2

The object of this example is to draw attention to the preferred mode for putting the catalyst in contact with the hydrocarbon and the hydrochloric acid.

Catalysts A and B are prepared in the same way as in Example 1.

10 grams of each of the non activated catalysts A and B are thus placed in a reactor and swept for a period of one hour under a total pressure of $10^5$ Pa and at a temperature in the range of 150° C.

We compare two methods of activation of these catalysts:
the first method consists, under the conditions listed above, in passing a mixture of hydrogen and hydrochloric acid for a period of 0.25 hour over the catalysts A and B then, for a period of 1 hour we add the hydrocarbon (n-hexane is chosen in this case).
the second method consists in directly passing the hydrogen, hydrochloric acid and hydrocarbon (n-hexane) mixture over the catalysts A and B.

The results of the tests resulting in the catalysts A3 and B3 thus activated are presented in Table IV hereafter.

The first two lines of the results in the table relate to catalysts A3 and B3 activated according to the first method of activation.

The last line of results in the table relate to catalysts A3 and B3 activated according to the second method of activation.

The activity of catalysts A3 and B3 is measured using the same isomerization test as that used in Example 1.

TABLE IV

| Activation Conditions | | | | Catalyst Activity | |
|---|---|---|---|---|---|
| Temperature | Rates (l/hr/10 g of catalyst) | | | | |
| | | | n-Hexane | Period of Time | TIN |
| (° C.) | H$_2$ | HCl | Hexane | (hours) | Catalyst A3 | Catalyst B3 |
| 150 | 4.2 | 0.74 | 0 | 0.25 | | |
| then 150 | 4.2 | 0.74 | 0.93 | 1 | 10 | 10 |
| 150 | 4.2 | 0.74 | 0.93 | 1 | 90 | 91 |

We see from this table, that, in order to obtain a good activation, we must not put the catalyst in contact with the hydrochloric acid alone, without the hydrocarbon.

EXAMPLE 3

This example relates to the use of activated catalysts as set forth in the invention, in an alkylation process of isobutane by butene-2-trans. The catalyst is prepared in the same manner as in the previous examples but does not contain any platinum.

Indeed, we put 100 g of alumina support from example 1, previously calcined at 530° C., in a stainless steel reactor under an inert gas. Then, 500 cm$^3$ of a normal solution of dichlorethylaluminum is introduced at 50° C. in normal heptane. After one hour, we eliminate the solvent and dry the solid obtained. We thus obtain a catalyst that contains Lewis type acid sites with an aluminum base.

10 g of this non activated catalyst are then placed in a reactor and swept for a period of one hour under a total pressure of $10^5$ Pa, at a temperature of 150° C., by 4.2 l of hydrogen, 0.74 l of hydrochloric acid and 0.93 l of n-hexane.

Then, a charge consisting of 14 moles of isobutane and one mole of butene-2-trans, with a total rate of 35 g/hr, at a temperature of 0° C. and under a pressure of $20.10^5$ Pa is passed over these 10 g of solid obtained after the activation After one hour of reaction, the results are as follows:

Conversion of the butene-2-trans: 73.3%

Yield in octanes: 106.7%

The octanes consist of 86.7% of trimethylpentane, in a significant percentage of 2,2,4-trimethlpentane (42.85%).

We note that the activated catalyst as set forth in the invention is also suitable for the alkylation reactions.

What is claimed is:

1. A process for activating a supported acid catalyst that contains Lewis acid type acid sites on a solid support comprising the step of transforming, in an acid and non-oxidizing environment, said sites into activated acid sites, where this process has an activation phase in an environment that contains a halohydrous acid or a halohydrous acid precursor, and wherein said activation phase is carried out in the presence of at least one hydrocarbon and/or one halogenated-hydrocarbon, with a halogen to hydrocarbon ratio that is greater than 0.001, at a temperature greater than 20° C. and at a pressure ranging between $10^5$ and $50.10^6$ Pa, for a period of time sufficient to obtain the transformation into activated acid sites.

2. The process as set forth in claim 1, wherein the hydrocarbon contained in the environment in which said activation phase is carried out is selected from $C_4$ to $C_8$ hydrocarbons and halogenated derivatives thereof.

3. The process as set forth in claim 1, wherein the Lewis site type acid sites are metallic halides.

4. The process as set forth in claim 1, wherein the activation is carried out with a halogen to hydrocarbon ratio that is greater than 0.005.

5. The process as set forth in claim 1, wherein the hydrocarbon is adsorbed on said catalyst and the halohydrous acid is subsequently put in contact with the catalyst.

6. The process as set forth in claim 1, wherein the halohydrous acid or its precursor is introduced into the environment in which the activation takes place in a continuous manner.

7. The process as set forth in claim 1, wherein the duration of the activation period is sufficient for at least 0.5% by weight of chlorine in relation to the weight of the catalyst to pass over the catalyst.

8. The process as set forth in claim 1, wherein after the activation is complete, the catalyst is placed at a temperature ranging between 50° C. and 250° C., under a pressure ranging between $10^5$ and $5.10^6$ Pa, with a hydrogen to hydrocarbon ratio ranging between 0.001 and 10 and an hourly space velocity ranging between 0.1 and 10 h$^{-1}$.

9. The process as set forth in claim 1, wherein the catalyst contains at least one metal of the platinum group.

10. The process as set forth in claim 1, wherein the content in platinum group metal in relation to the weight of the support ranges between 0.02% and 2% by weight.

11. The process as set forth in claim 1, wherein the catalyst comprises one or more metals selected from aluminum, boron, gallium, zirconium, platinum, ruthenium, rhodium, palladium and iridium.

12. The process as set forth in claim 1, wherein the solid catalytic support is an alumina, a silica, an alumina silica, an aluminosilicate or or mixtures thereof, magnesia, zirconia, or gallium, titanium, thorium, boron oxide, or a mixture of these oxides.

13. The process as set forth in claim 1, wherein the catalytic support is a gamma-alumina or an eta-alumina.

14. The process as set forth in claim 1, wherein the halohydrous acid is generated in situ from a halohydrous acid precursor.

15. The process as set forth in claim 1, wherein the halohydrous acid is hydrochloric acid formed from a precursor.

16. The process as set forth in claim 1, wherein the partial halohydrous acid pressure ranges between $10^2$ Pa and $10^5$ Pa, and the partial hydrocarbon pressure is at least equal to that of the halohydrous acid.

17. The process as set forth in claim 9, wherein the catalyst contains at least one metal from the platinum group, the acid and non oxidizing environment contains hydrogen and/or an inert gas.

18. The process according to claim 1, wherein the hydrocarbon contained in the environment in which said activation phase is carried out, includes $C_5$ and $C_6$ hydrocarbons and halogenated derivatives thereof.

19. The process according to claim 1, wherein said activation phase is carried out in the presence of paraffinic hydrocarbons.

20. The process according to claim 1, wherein said activation phase is carried out at a temperature ranging between 100 °C. and 250 °C.

21. The process according to claim 3, wherein said metallic halides are selected from aluminum, boron, gallium, or zirconium halide.

22. The process according to claim 3, wherein said metallic halide is an aluminum halide.

23. The process according to claims 3, wherein said metallic halides are chlorine and bromine metallic halides.

24. The process as set forth in claim 10, wherein the content in platinum group metal in relation to the weight of the support ranges between 0.05% and 0.8%.

25. The process as set forth in claim 15, wherein the hydrochloric acid precursor is an alkane chloride.

26. The process as set forth in claim 15, wherein the hydrochloric acid precursor is carbon tetrachloride.

27. The process as set forth in claim 1, wherein the hydrocarbon is adsorbed on said catalyst and the halohydrous acid is simultaneously put in contact with the catalyst.

28. The process as set forth in claim 1, wherein the hydrocarbon is adsorbed on said catalyst and the halohydrous acid is simultaneously put in contact with the catalyst and halohydrous acid is subsequently put in contact with the catalyst.

29. The process as set forth in claim 1, wherein the halohydrous acid or its precursor is introduced into the environment in which the activation takes place in a discontinuous manner.

* * * * *